US007382707B2

(12) United States Patent
Chou et al.

(10) Patent No.: US 7,382,707 B2
(45) Date of Patent: Jun. 3, 2008

(54) RECORDING METHOD AND APPARATUS FOR OPTICAL DISK DRIVE

(75) Inventors: Tzu-Ming Chou, Sinjhuang (TW); Kun-Hung Hsieh, Hsinchu (TW); Wei-Yu Lin, Hsinchu (TW); Yao-Lung Chuang, Sanchong (TW); Chun-Jen Chen, Gangshan Township (TW); Kuo-Jung Lan, Jhonghe (TW)

(73) Assignee: Mediatek Inc. (TW)

( * ) Notice: Subject to any disclaimer, the term of this patent is extended or adjusted under 35 U.S.C. 154(b) by 336 days.

(21) Appl. No.: 11/160,114

(22) Filed: Jun. 9, 2005

(65) Prior Publication Data
US 2005/0219970 A1    Oct. 6, 2005

Related U.S. Application Data

(63) Continuation-in-part of application No. 10/711,943, filed on Oct. 14, 2004.

(30) Foreign Application Priority Data
Dec. 3, 2003    (TW) .............................. 92134059 A

(51) Int. Cl.
*G11B 7/00*    (2006.01)
(52) U.S. Cl. ................................. 369/53.31; 369/47.38
(58) Field of Classification Search ............. 369/53.31, 369/47.38
See application file for complete search history.

(56) References Cited

U.S. PATENT DOCUMENTS 5,363,362 A * 11/1994 Maeda et al. ............ 369/47.33
5,852,593 A * 12/1998 Ishida et al. ............. 369/53.18
6,317,398 B1 * 11/2001 Shimada ................... 369/47.32
6,704,253 B2    3/2004 Tanaka
6,754,150 B1 * 6/2004 Usui ........................ 369/47.33
6,930,964 B2 * 8/2005 Matsui ....................... 369/47.3
2001/0003519 A1 * 6/2001 Tsukihashi ............... 369/53.36
2002/0101793 A1    8/2002 Sakata
2002/0172106 A1    11/2002 Kim et al.

(Continued)

FOREIGN PATENT DOCUMENTS

CN    1452171 A    10/2003

(Continued)

*Primary Examiner*—Wayne Young
*Assistant Examiner*—Van T. Pham
(74) *Attorney, Agent, or Firm*—Connolly Bove Lodge & Hutz LLP; Myron Keith Wyche

(57) ABSTRACT

A recording method for an optical disk drive is implemented as follows. First, at least one of the level of the focusing error signal, the level of the tracking error signal, a wobble synchronization pattern loss, the error rate of demodulating a wobble signal, the frequency of buffer under-run occurrence, the temperature of the drive, the wobble jitter and the level of write power is detected. If at least one detected value exceeds the preset value, the recording will be ceased. Then, the rotation speed of the optical disk drive is decreased, and the recording is resumed with the decreased rotation speed. If at least one of the temperature of the drive, the wobble jitter and the estimated write power exceeds the reset value before recording starts, the rotation speed of the optical disk drive is decreased before recording.

3 Claims, 6 Drawing Sheets

U.S. PATENT DOCUMENTS

| | | |
|---|---|---|
| 2003/0072235 A1* | 4/2003 | Naoi et al. ............... 369/53.18 |
| 2003/0165097 A1 | 9/2003 | Tseng et al. |
| 2003/0198155 A1 | 10/2003 | Go et al. |
| 2004/0004920 A1 | 1/2004 | Jung et al. |
| 2004/0141441 A1 | 7/2004 | Nagai et al. |
| 2005/0122869 A1* | 6/2005 | Yamamoto ............... 369/53.12 |
| 2005/0128914 A1* | 6/2005 | Yamamoto ............... 369/53.31 |

FOREIGN PATENT DOCUMENTS

| | | |
|---|---|---|
| CN | 1488140 A | 4/2004 |
| EP | 1 453 209 A2 | 9/2004 |
| WO | WO 03/085839 A1 | 10/2003 |

* cited by examiner

RECORDING METHOD AND APPARATUS FOR OPTICAL DISK DRIVE

CROSS REFERENCE TO A RELATED APPLICATION

This Application is a Continuation-in-part of application Ser. No. 10/711,943 filed on Oct. 14, 2004. Application Ser. No. 10/711,943 claims priority for Application 092134059 filed on Dec. 3, 2003 in Taiwan. The entire contents of each of these applications is incorporated herein by reference.

BACKGROUND OF THE INVENTION

The present invention is related to a recording, or so-called burning, method and an apparatus for an optical disk drive, and more particularly to a recording method and an apparatus capable of decreasing the rotation speed for an optical disk drive.

The recording speed, e.g., 4× or 8×, of an optical disk drive mainly depends on the type of the optical disk, and optical disks of different types have different time codes. If the quality of the optical disk or optical disk drive is worse intrinsically, the recording efficiency and quality will be affected, especially for mass recording, and thus inferior recording quality will become more obvious.

An inferior servo signal of an optical disk drive, e.g., defocusing, or buffer under-run caused by that the data transmission speed from a host is slower than the recording speed, may give rise to the interruption of recording. After refocusing or complementing the data to the buffer, the recording will be reconnected and resumed. Because the recording speed before and after the interruption is not changed, the interruption and reconnection may occur repeatedly. Such unceasing recording interruption and reconnection seriously affect the recording speed, and even result in the degradation of the recording quality so that the readability of the optical disk will become worse.

U.S. Pat. Application. No. 2002/0172106 A1,"Apparatus for and Method of Controlling Writing of Data When Error Occurs in an Optical Drive," reveals a method of dealing with a recording interruption employed after the recording is interrupted. However, the method cannot prevent the occurrence of interruption. In addition, if an optical disk is of inferior quality, the recording quality of the optical disk cannot be improved further.

SUMMARY OF THE INVENTION

The objective of the present invention is to provide a recording method and an apparatus for an optical disk drive, which are capable of preventing the recording quality degradation due to the inferior servo signal, and can avoid the decrease of recording efficiency due to the continual recording interruption and reconnection caused by the buffer under-run.

To accomplish the above objective, the present invention discloses a recording method for an optical disk drive. First, at least one unstable signal source during the recording process is detected, where the unstable signal source is selected from the group of the level of a focusing error (FE) signal, the level of a tracking error (TE) signal, a wobble synchronization pattern loss, the error rate of demodulating a wobble signal and the frequency of the buffer under-run occurrence of the optical disk drive. The recording will be paused if any detected value of the unstable signal source exceeds a preset threshold value. Afterwards, the rotation speed of the optical disk drive is decreased, and the recording is resumed with the decreased rotation speed.

In addition, the temperature of the optical disk drive, wobble jitter and write power can also be used as monitoring indices. For instance, if the temperature of the drive, a wobble jitter or a write power exceeds a preset threshold value while recording, the recording will be paused and the rotation speed of the optical disk will be decreased. Then, the recording resumes with a lower rotation speed. Besides, these indices can be monitored before recording, and as a result, inferior recordings can be minimized to guarantee the recording quality.

The above-described recording method can be implemented using a recording apparatus for an optical disk drive. The recording apparatus comprises a driver, a servo signal generation unit, a microprocessor and a digital signal processor (DSP), where the driver is used for controlling the rotation speed of the optical disk drive, and the servo signal generation unit is used to generate the level of an FE signal and the level of a TE signal of the optical disk drive and generate and demodulate a wobble signal, so as to obtain a wobble synchronization pattern loss. The microprocessor can execute a detection mechanism, a recording termination control mechanism and a recording speed adjustment mechanism. The detection mechanism is intended to detect the error rate of demodulating the wobble signal and the frequency of the buffer under-run occurrence. If at least one of the level of the FE signal, the level of the TE signal, the wobble synchronization pattern loss, the error rate of demodulating the wobble signal and the frequency of the buffer under-run occurrence exceeds a preset threshold value, the recording termination control mechanism will cease recording based on the recording status at that time, and the recording speed adjustment mechanism will set parameters for reducing the rotation speed of the optical disk drive. Then, the parameters are transmitted to the DSP to generate a driving signal, so as to instruct the driver to decrease the rotation speed of the optical disk drive.

The recording method and apparatus of an optical disk drive in accordance with the present invention use the microprocessor to real-time monitor the optical disk drive, in which the servo signals of the optical disk drive, the frequency of the buffer under-run occurrence and the error rate of demodulating the wobble signal during recording are continuously monitored to timely adjust the rotation speed of the optical disk drive, with a view to preventing the continual servo signal deterioration and the buffer under-run.

DETAILED DESCRIPTION OF THE INVENTION

Figure 1:
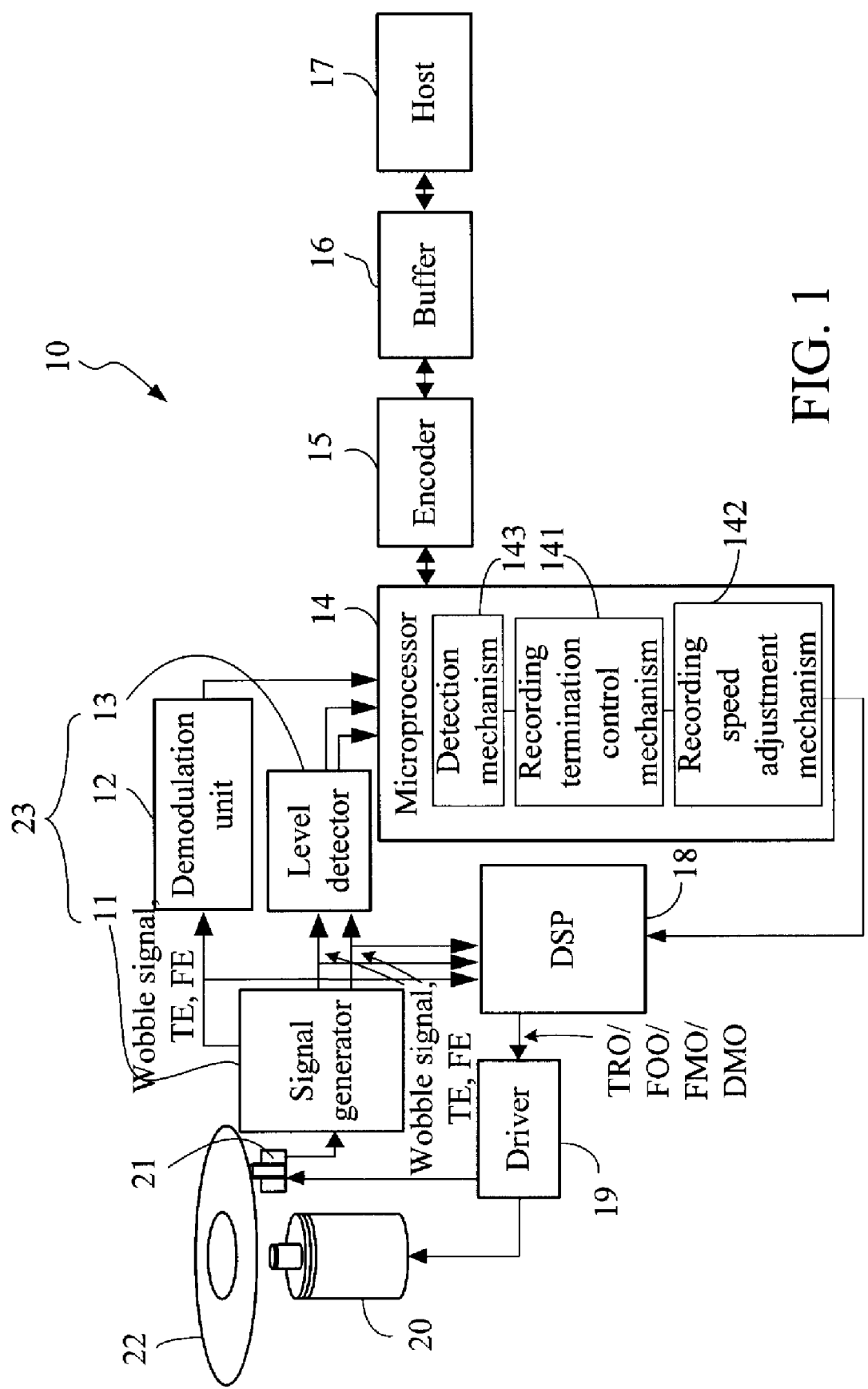
FIG. 1 illustrates a recording apparatus of an optical disk drive in accordance with the present invention.

FIG. 1 is a schematic diagram of an embodiment of the recording apparatus of an optical disk drive in accordance with the present invention. A recording apparatus 10 for an optical disk drive comprises a signal generator 11, a demodulation unit 12, the level detector 13, a microprocessor 14, an encoder 15, a buffer 16, a host 17, a DSP 18 and a driver 19, where the signal generator 11, the demodulation unit 12 and the level detector 13 constitute a servo signal generation unit 23. The signal generator 11 connected to an optical pickup head 21 is used to synthesize the optical signals read from an optical disk 22 by the optical pickup head 21, so as to generate the TE signals required for track locking, the FE signals required for focusing, and the wobble signals required for positioning or controlling the rotation speed. All these servo signals are then sent to the DSP 18 for processing so as to generate driving signals TRO, FOO, FMO and DMO. The driver 19 is able to drive the optical pickup head 21 by the driving signals TRO, FOO and FMO, and drive the motor 20 to rotate the optical disk 22 by the driving signal DMO. Besides being transmitted to the DSP 18 from the signal generator 11, the TE, FE and the wobble signals are also sent to the demodulation unit 12 and the level detector 13, respectively. The demodulation unit 12 is used to demodulate the wobble signal, and if the error rate is too high or the wobble synchronization pattern loss exceeds a preset threshold value, a recording termination control mechanism 141 and a recording speed adjustment mechanism 142 will be activated to interrupt recording and decrease the rotation speed of the motor 20, i.e., the recording speed will be decreased. If the level detector 13 figures out that the levels of the TE and FE signals exceed preset threshold values, the recording termination control mechanism 141 and the recording speed adjustment mechanism 142 will be activated as well. The microprocessor 14 is used to control and execute the recording termination control mechanism 141 and the recording speed adjustment mechanism 142. First, the recording termination control mechanism 141 sends a recording pause command to the encoder 15 and informs the host 17 to stop transferring data to the buffer 16. When the recording termination is confirmed, the microprocessor 14 will set relative parameters for decreasing the rotation speed of the optical disk drive, and transmit the parameters to the DSP 18 for generating the driving signal DMO to lower the rotation speed of the motor 20. Afterwards, the recording termination control mechanism 141 sends a recording connection command to the encoder 15 to implement the sequential recording work and continuously monitor whether the servo signals meet the recording termination criteria. Further, the microprocessor 14 also can implement a detection mechanism 143 to detect the error rate of a demodulated wobble signal and the frequency of the buffer under-run occurrence. If the error rate of the demodulated wobble signal and the frequency of the buffer under-run occurrence exceed the preset threshold values, the recording termination control mechanism 141 and the recording speed adjustment mechanism 142 will also be activated to cease recording and decrease the recording speed.

Figure 2:
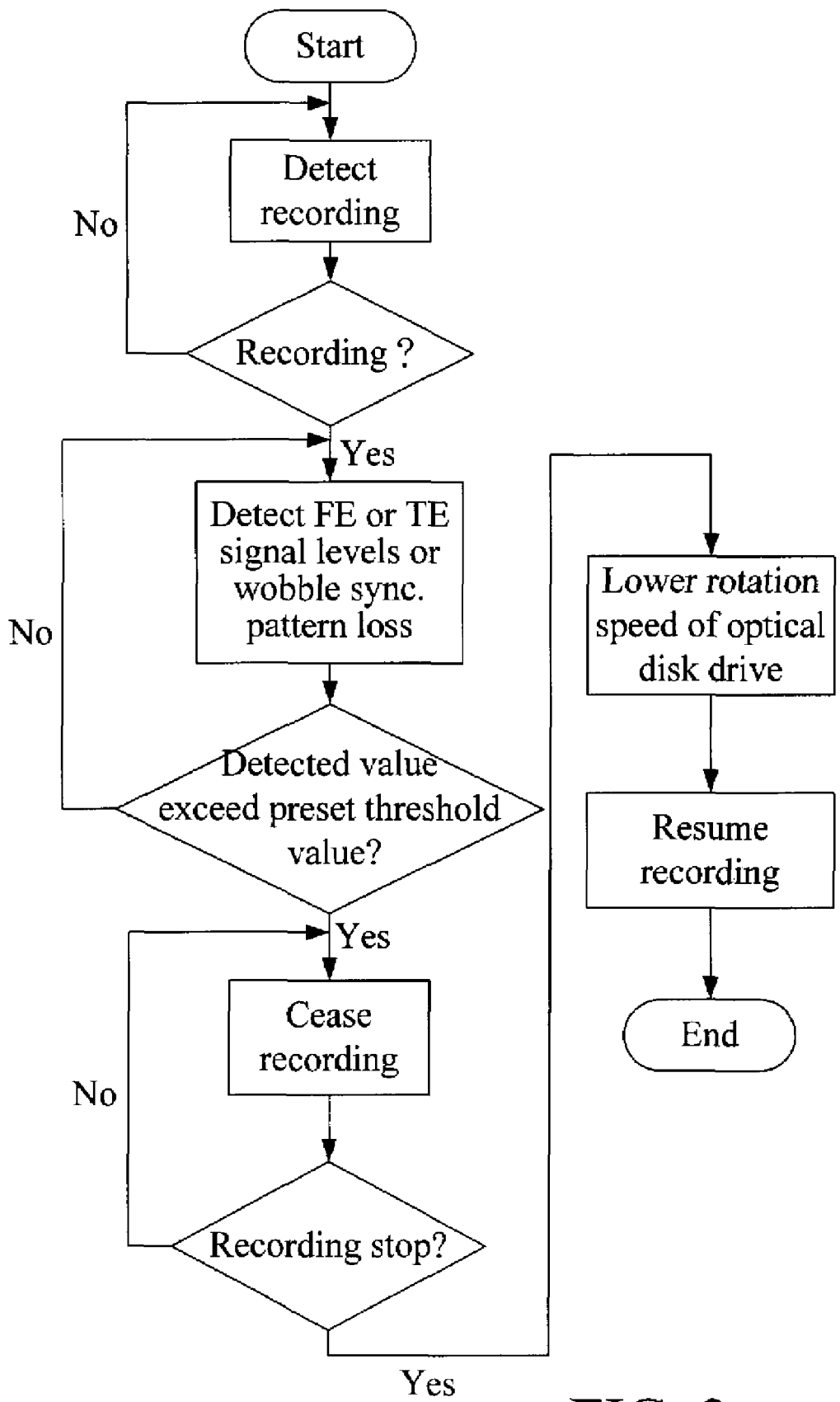
FIG. 2 illustrates a recording flow chart of an optical disk drive of the first embodiment in accordance with the present invention.

The above-described recording process can be concluded as shown in FIG. 2. First, if the recording is underway in the optical disk drive, the detection of servo signals such as the level of the FE or TE signal and the wobble synchronization pattern loss are started. If the detected values of the above-described servo signals exceed the preset thresholds, the recording will be ceased. Subsequently, the rotation speed of the optical disk drive is decreased and the sequential recording work is resumed. The above described recording process can be supplemented with a step of detecting the recording status to ensure whether the optical disk drive is in recording or stop status, so as to avoid the impact of the recording quality and the recording speed due to the error during the implementation of detecting the servo signal or decreasing recording speed.

Figure 3:
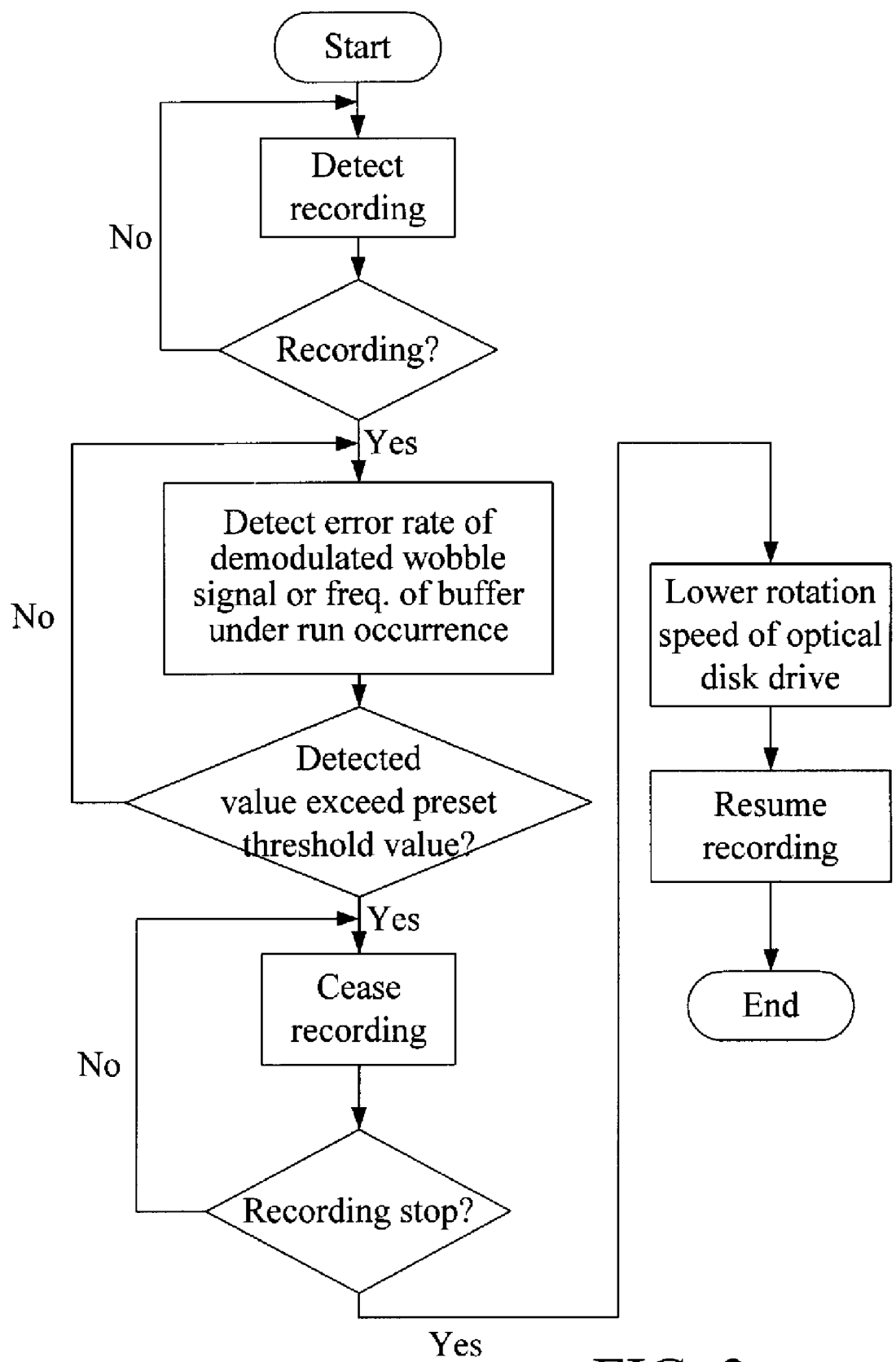
FIG. 3 illustrates a recording flow chart of an optical disk drive of the second embodiment in accordance with the present invention.

Besides taking the above-described servo signals as the basis for decreasing the rotation speed of the optical disk drive, the error rate of demodulating the wobble signal or the number of recording interruption caused by the buffer under-run in a time period, i.e., the frequency of the buffer under-run occurrence, also can be calculated as the basis for activating the recording speed adjustment mechanism. If the error rate of demodulating a wobble signal or the frequency of the buffer under-run occurrence exceeds the preset threshold value, the recording is not resumed until the rotation speed of the optical disk drive is decreased. The above process is shown in FIG. 3.

Moreover, other signals such as the temperature of the drive, the wobble jitter of the wobble signal, or write power can be used as determination indices for decreasing the driver rotation speed as well. These parameters may be monitored and controlled prior to recording, so that the recording quality at the beginning of recording can be further improved.

Figure 4:
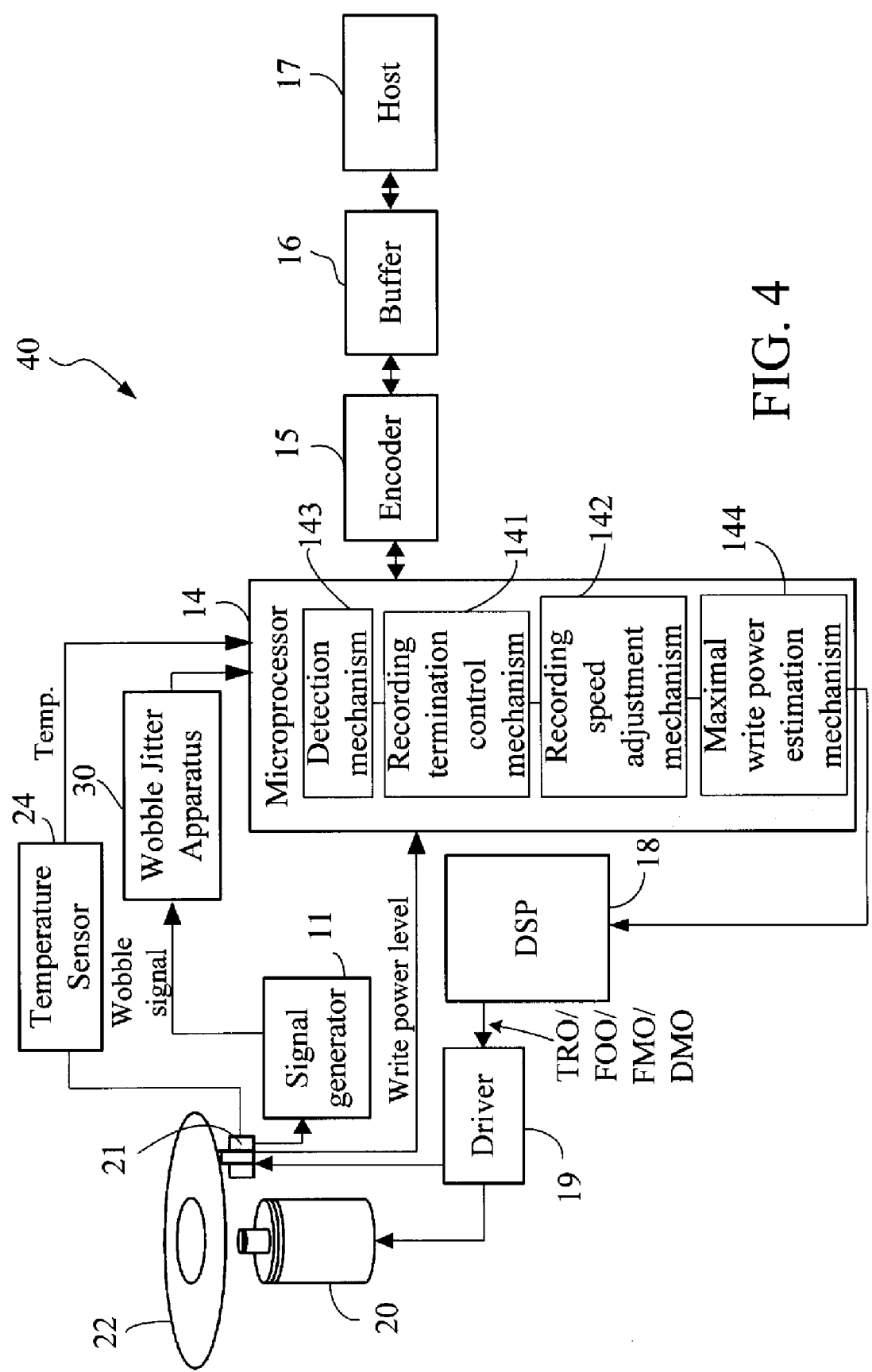
FIG. 4 illustrates another recording apparatus of an optical disk drive in accordance with the present invention.

FIG. 4 illustrates another embodiment of the recording apparatus 40 of an optical disk drive in accordance with the present invention, which is similar to FIG. 1. In comparison with FIG. 1, a wobble jitter apparatus 30 is in place of the demodulation unit 12 for detecting the jitter of the wobble signal, the level detector 13 in FIG. 1 is omitted. The temperature of the drive detected by a temperature sensor 24 and the write power level are transmitted to the microprocessor 14. Consequently, the temperature of the drive, the wobble jitter and the write power are further taken into account for determining the timing to decrease the rotation speed of the driver 19. The wobble jitter apparatus 30 can be omitted if the microprocessor 14 is capable of calculating the jitter of the wobble signal. The microprocessor 14 further comprises a maximal write power estimation mechanism 144 for estimating the maximal value of write power during recording process according to the result of optimal power calibration (OPC), which is intended to control the DSP 18.

Figure 5:
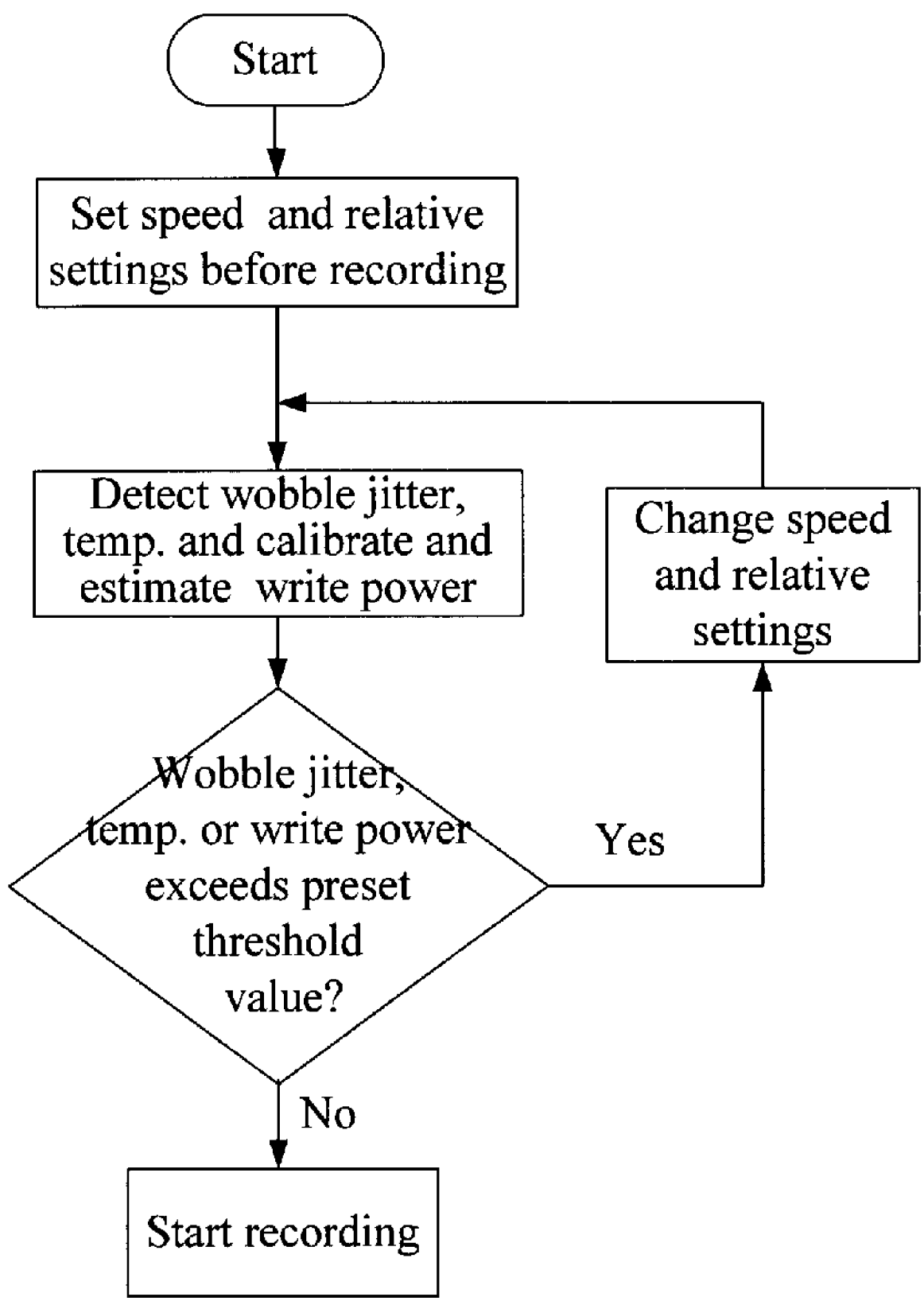
FIG. 5 illustrates a recording flow chart of an optical disk drive before recording of the third embodiment in accordance with the present invention.

FIG. 5 illustrates the control process of the driver speed before recording. The driver speed and the relative settings are set, and then the wobble jitter and the temperature of the drive are detected and the write power is calibrated and estimated. If at least one of the wobble jitter, the temperature of the drive and write power exceeds the corresponding preset value, the driver speed is lowered and the relevant settings are changed. Otherwise, it is deemed as a safe situation and the recording is started.

Figure 6:
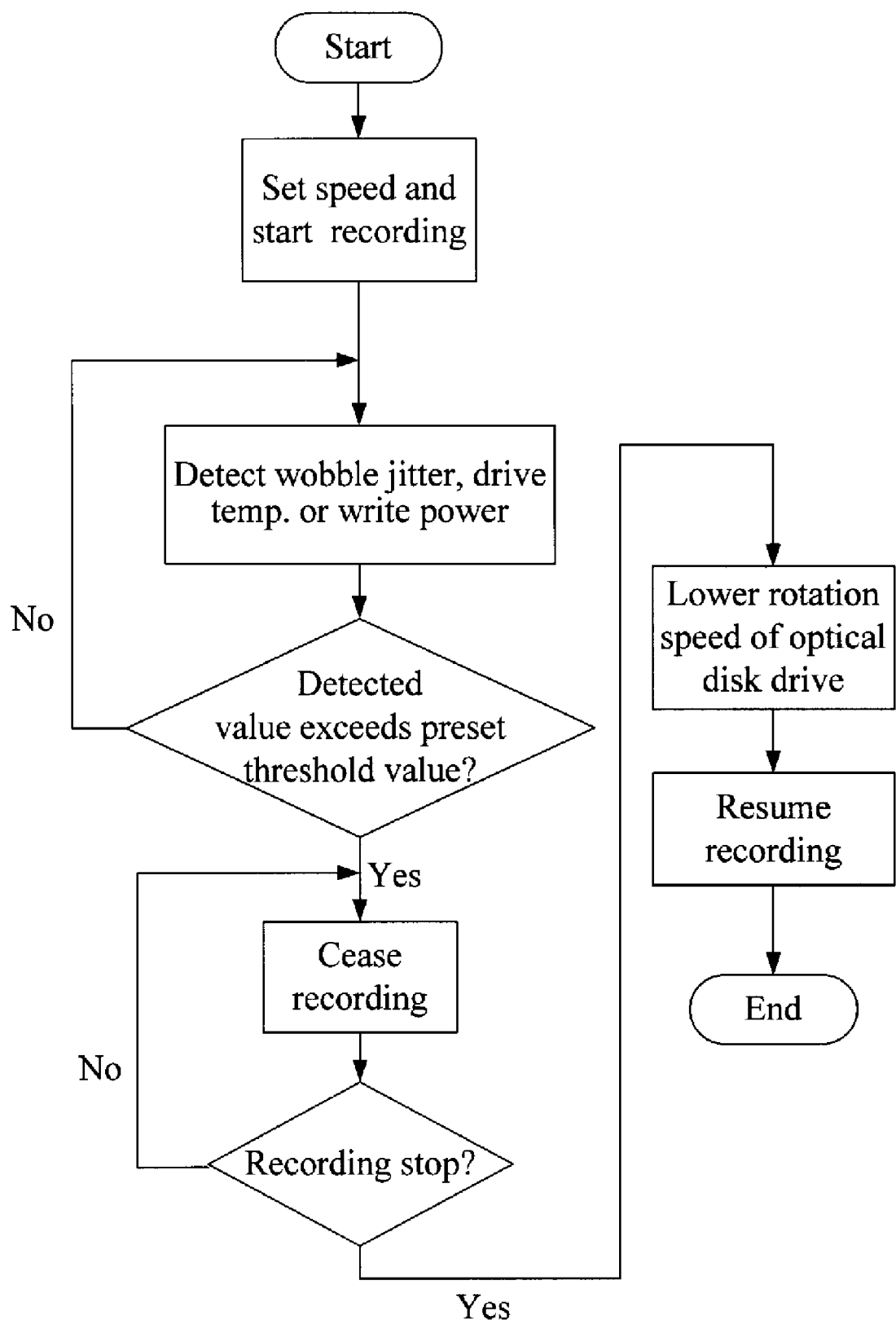
FIG. 6 illustrates a recording flow chart of an optical disk drive during recording of the fourth embodiment in accordance with the present invention.

FIG. 6 illustrates the control process of the driver speed during recording, i.e., after the recording is started. Similarly, the driver speed and the relative settings are set and followed by detecting the temperature of the drive, the wobble jitter or the write power. If the temperature of the drive, the wobble jitter or the write power exceeds the preset threshold value, the recording is paused, and the rotation speed of the driver is decreased afterwards. The recording is not resumed until the rotation speed of the optical disk drive is decreased.

The above-described embodiments of the present invention are used to be illustrative only. Numerous alternative embodiments may be devised by those skilled in the art without departing from the scope of the following claims.

What is claimed as new and desired to be protected by Letters Patent of the United States is:

1. A recording apparatus for an optical disk drive, comprising:
   a driver being capable of controlling the rotation speed of the optical disk drive;
   a temperature sensor connected to an optical pickup head of the optical disk drive for generating a temperature signal of the optical disk drive;
   a microprocessor, comprising:
      a detection mechanism for detecting the temperature signal and the write power of the driver as determination indices;
      a recording termination control mechanism for stopping recording if at least one of the determination indices exceeds a preset threshold value; and
      a recording speed adjustment mechanism for setting parameters with a lower rotation speed if at least one of the determination indices exceeds the preset threshold value; and
      a maximal write power estimation mechanism for checking the maximum value of write power during the recoding process according to the result of optimal power calibration (OPC); and
   a digital signal processor for converting the parameters with the lower rotation speed into a driving signal that instructs the driver to decrease the rotation speed of the optical disk drive.

2. The recording apparatus for an optical disk drive in accordance with claim 1, further comprising a signal generator for generating a wobble signal, wherein the microprocessor calculates the wobble jitter of the wobble signal as another determination index.

3. The recording apparatus for an optical disk drive in accordance with claim 2, further comprising a wobble jitter apparatus, which receives a wobble signal from the signal generator and calculates the wobble jitter of the wobble signal as another determination index.

* * * * *